J. KELLY.
VEHICLE.
APPLICATION FILED JAN. 27, 1909.

945,330.

Patented Jan. 4, 1910.
2 SHEETS—SHEET 1.

Witnesses:
Sydney E. Taft.
Sadie V. McCarthy.

Inventor:
John Kelly,
by his attorney Walter V. Gooding.

J. KELLY.
VEHICLE.
APPLICATION FILED JAN. 27, 1909.

945,330.

Patented Jan. 4, 1910.

2 SHEETS—SHEET 2.

Witnesses:
Sydney E. Taft.
Sadie V. McCarthy.

Inventor:
John Kelly,
by his attorney,
Charles S. Gooding.

UNITED STATES PATENT OFFICE.

JOHN KELLY, OF JAMAICA PLAIN, MASSACHUSETTS.

VEHICLE.

945,330.  Specification of Letters Patent.  Patented Jan. 4, 1910.

Application filed January 27, 1909. Serial No. 474,422.

*To all whom it may concern:*

Be it known that I, JOHN KELLY, a citizen of the United States, residing at Jamaica Plain, in the county of Suffolk and State of Massachusetts, have invented new and useful Improvements in Vehicles, of which the following is a specification.

This invention relates to an improved vehicle for carrying ashes, garbage and other matter consisting of small bodies.

One object is to provide a vehicle of this class which may be easily loaded from the ground and in the attainment of this object I have produced a hopper arranged at a convenient height above the ground and a conveyer adapted to convey the material from the hopper upward and deposit the same into the receptacle.

Another object is to provide suitable means for driving the conveyer and in the attainment of this object I have provided an engine arranged to drive the conveyer and also to propel the vehicle, there being suitable gearing and devices arranged to connect the engine to the driving wheels and to the conveyer at will.

The invention consists in the novel features of construction and in the combination and arrangement of parts set forth in the following specification and particularly pointed out in the appended claims.

Figure 1:
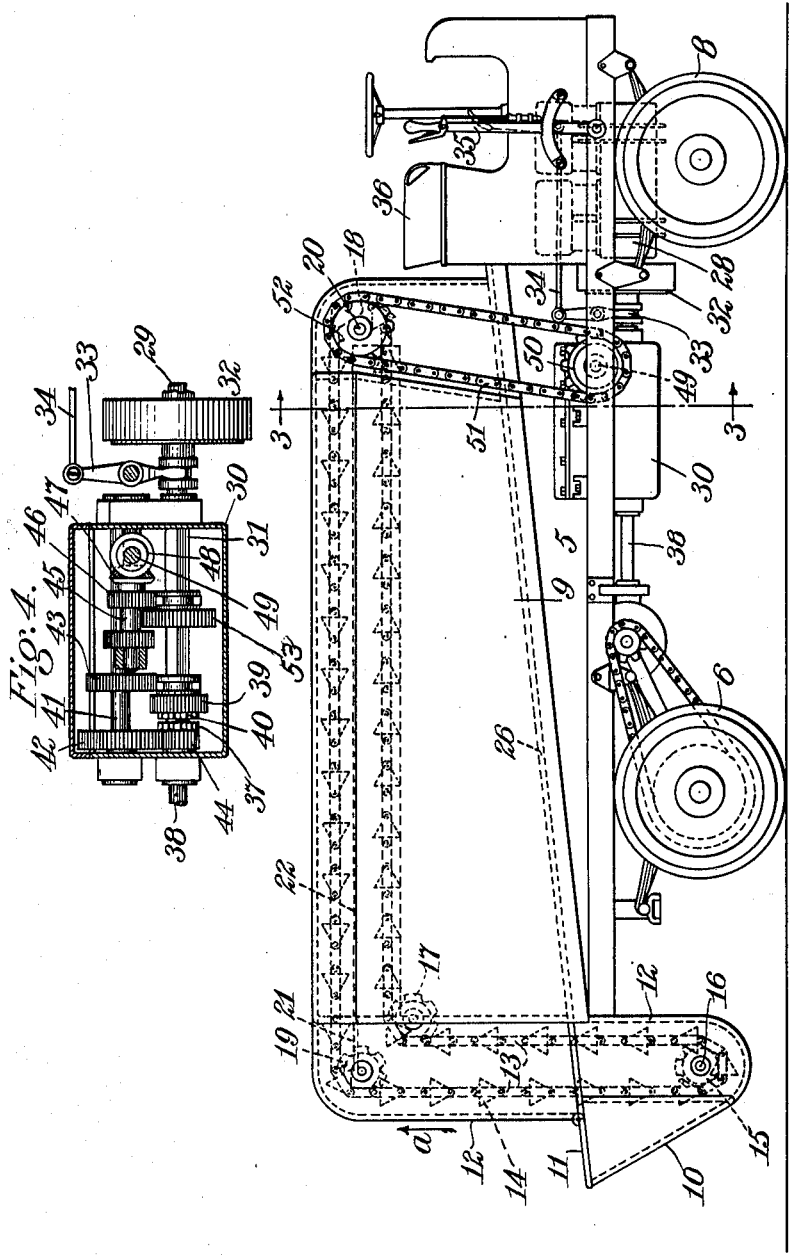
Figure 2:
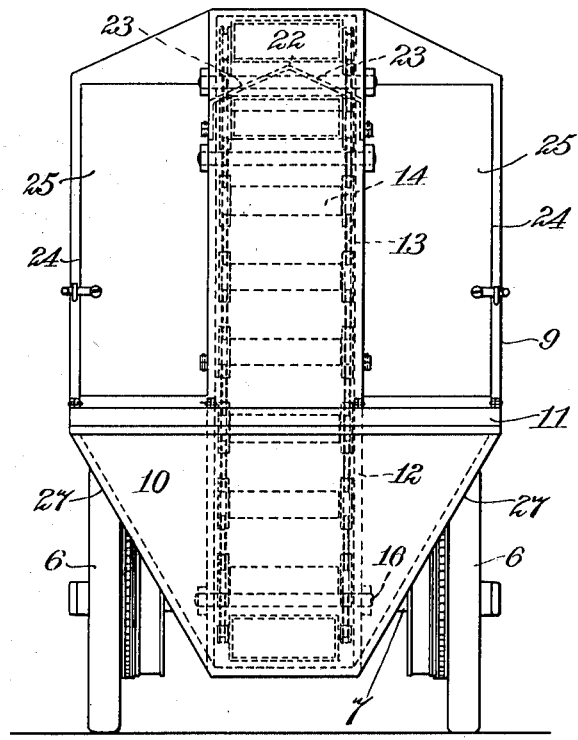
Figure 3:
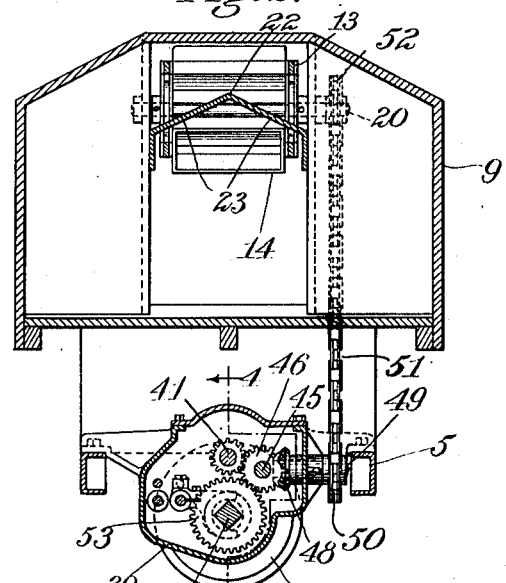

Referring to the drawings: Figure 1 is a side elevation of a vehicle body embodying my invention. Fig. 2 is an elevation viewed from the rear of the vehicle, or in other words, from the left of Fig. 1. Fig. 3 is an enlarged sectional view taken on line 3—3 of Fig. 1, looking toward the right. Fig. 4 is a sectional view taken on line 4—4 of Fig. 3, looking toward the left.

Like numerals refer to like parts throughout the several views of the drawings.

In the drawings, 5 is the frame of the vehicle, 6, 6 are the rear driving wheels mounted upon an axle 7 and 8 is one of the pair of usual front steering wheels. Mounted upon the frame 5 is a box 9 and at the rear thereof is mounted a hopper 10 having an inlet orifice arranged at a convenient height above the ground, there being provided a hinged cover 11 adapted to close said orifice. Mounted on the rear end of the box 9 is a conveyer casing 12 communicating with the hopper 10 and with the interior of the box 9.

A link belt conveyer is located partly within the box 9 and partly within the casing 12, said conveyer comprising an endless chain or link belt 13 on which are mounted a series of buckets 14. The link belt 13 extends part way around sprocket wheels 15 fast to a shaft 16 journaled in the casing 12, thence part way around sprocket wheels 17, 18 and 19 back to the point of beginning, the sprocket wheels 18 being fast to a driving shaft 20 journaled in suitable bearings in the box 9. The direction of the travel of the chain 13 is indicated by the arrow $a$, Fig. 1.

When material is placed in the hopper 10 each of the buckets 14 in passing said hopper is filled with the material and carries the same first upwardly and thence longitudinally of the box 9 toward the front thereof. In order that the buckets 14 may be prevented from dumping their load before passing into the box 9 there is provided a guard plate 21 extending from the axis of the sprocket wheels 19 into said box, as shown. In order that the buckets containing the material may be prevented from dumping their contents onto the returning empty buckets therebeneath there is provided a shedding device 22 interposed between the upper and lower portions of the horizontally extending part of the conveyer, said shedding device having two laterally inclined portions 23, 23, the combined width of which is greater than the width of the link belt so that the material dumped by the upper set of buckets falls onto said shedding device and slides down the inclined portions and falls into a pile at the bottom of the box 9.

The box 9 is provided at its rear end with two openings 24, 24 closed by doors 25, 25, respectively, these openings being provided for the purpose of emptying the box of its contents. The bottom 26 of the box 9 is preferably inclined downwardly from the front toward the rear thereof so that when the doors 25 are opened the material will be carried by gravity outwardly therethrough.

The hopper 10 is preferably provided with two lateral walls 27, 27 which converge downwardly toward the bottom thereof, it being observed that the opening at the top is of such width as to make it convenient to dump the barrels of ashes or other material thereinto. Mounted on the frame 5 is an engine 28 having a shaft 29. Fast to the frame 5 is a transmission gear case 30 in which is journaled a shaft 31. Interposed between the shaft 31 and the shaft 29 is a clutch 32 of any usual or desired type, whereby said shafts may be connected and disconnected one from the other at will, there being provided for this purpose a clutch lever 33 connected by a link 34 to an operating lever 35 arranged at a convenient point opposite the driver's seat 36. The rear end of the shaft 31 is journaled in a clutch member 37 fast to a shaft 38, which latter shaft is connected in any well known manner to the driving wheels 6.

Slidably mounted on the shaft 31 is a gear 39 which gear carries a clutch member 40 adapted to engage the clutch member 37 to cause the rotation of the shaft 31 to be imparted to the shaft 38 to drive the rear driving wheels 6. Journaled in the casing 30 is a secondary shaft 41, to which shaft two gears 42 and 43 are fast, the gear 42 meshing into a gear 44 fast to or formed on the clutch member 37. As is common with transmission gearing for motor cars, the gear 39 may be moved toward the right from the position shown in Fig. 4 into mesh with the gear 43 so as to rotate the secondary shaft 41, the rotation of said shaft being imparted through the gear 42 to drive the gear 44 and shaft 38 at a reduced speed, the sliding of the gear 39 and clutch 40 being effected by any usual or desired means.

Mounted in the casing 30 is a shaft 45 on which is journaled a spur gear 46 fast to a bevel gear 47, said bevel gear meshing into a bevel gear 48 fast to a shaft 49 journaled in said casing. Fast to the shaft 49 is a sprocket wheel 50, said sprocket wheel being connected by a chain 51 to a second sprocket wheel 52 fast to the shaft 20. Slidably mounted on the shaft 31 is a gear 53 adapted to be moved by any usual or desired means into and out of mesh with the gear 46, it being understood that when said gears are in mesh and the clutch 32 is engaged the rotation of the engine shaft is imparted through said gears, through the gears 47 and 48 and through the sprocket wheels and chain just described to the driving shaft 20 of the conveyer.

The vehicle of my invention, while it may be used for a great variety of purposes, is adapted to be used for collecting ashes and garbage about the streets. In the use of the ordinary ash and garbage wagons it is, of course, necessary to lift the barrels containing the garbage or ashes to a considerable height in order to dump them into the box of the wagon, thus the advantage of my improved wagon will be readily apparent for the reason that the barrels are dumped into the hopper 10 and the conveyer conveys the material upwardly from said hopper and dumps the same into the wagon box.

Having thus described my invention, what I claim and desire by Letters Patent to secure is:

1. A vehicle of the class described having, in combination, a receptacle a hopper located at the rear of said receptacle, said receptacle having a rear wall provided with two openings, closures for said openings, and a conveyer interposed between said openings and adapted to convey material upwardly from said hopper and deposit the same in said receptacle.

2. A vehicle of the class described having, in combination, a hopper, a receptacle, an endless belt conveyer having a portion extending upwardly from said hopper and having a portion extending along above the bottom of said receptacle, said last-named portion consisting of two parts located one above the other, a shedding device interposed between said parts and adapted to shed the material laterally, and means to prevent said conveyer from discharging the material carried thereby before reaching said shedding device.

In testimony whereof I have hereunto set by hand in presence of two subscribing witnesses.

JOHN KELLY.

Witnesses:
LOUIS A. JONES,
SADIE V. MCCARTHY.